Feb. 9, 1932.  R. S. A. DOUGHERTY  1,844,244
GEAR ENTRAINING MECHANISM
Filed June 8, 1929   5 Sheets-Sheet 1

INVENTOR
Robert S. A. Dougherty

Feb. 9, 1932.  R. S. A. DOUGHERTY  1,844,244
GEAR ENTRAINING MECHANISM
Filed June 8, 1929   5 Sheets-Sheet 2

INVENTOR
Robert S. A. Dougherty

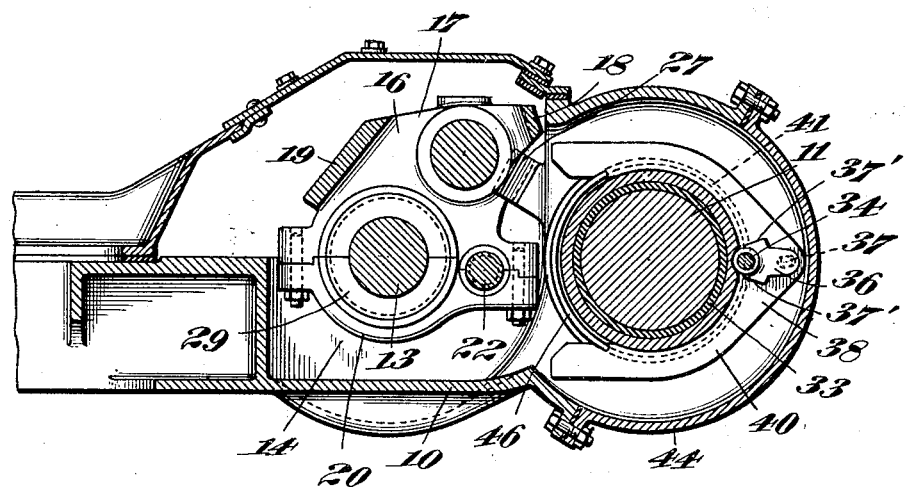
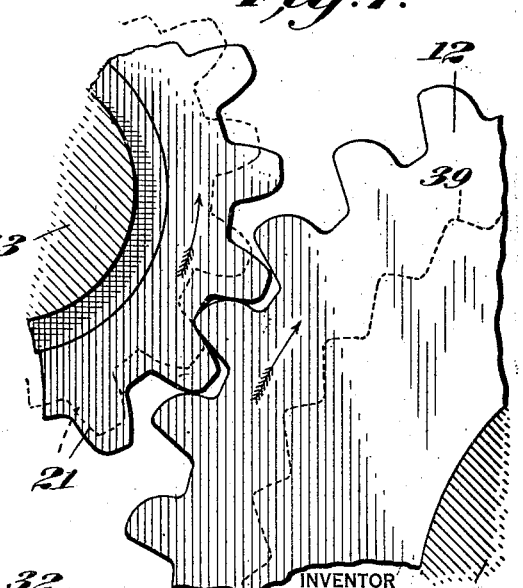
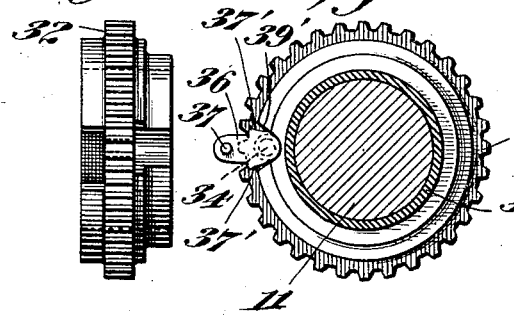

Feb. 9, 1932.    R. S. A. DOUGHERTY    1,844,244
GEAR ENTRAINING MECHANISM
Filed June 8, 1929    5 Sheets-Sheet 4

Inventor
Robert S. A. Dougherty.

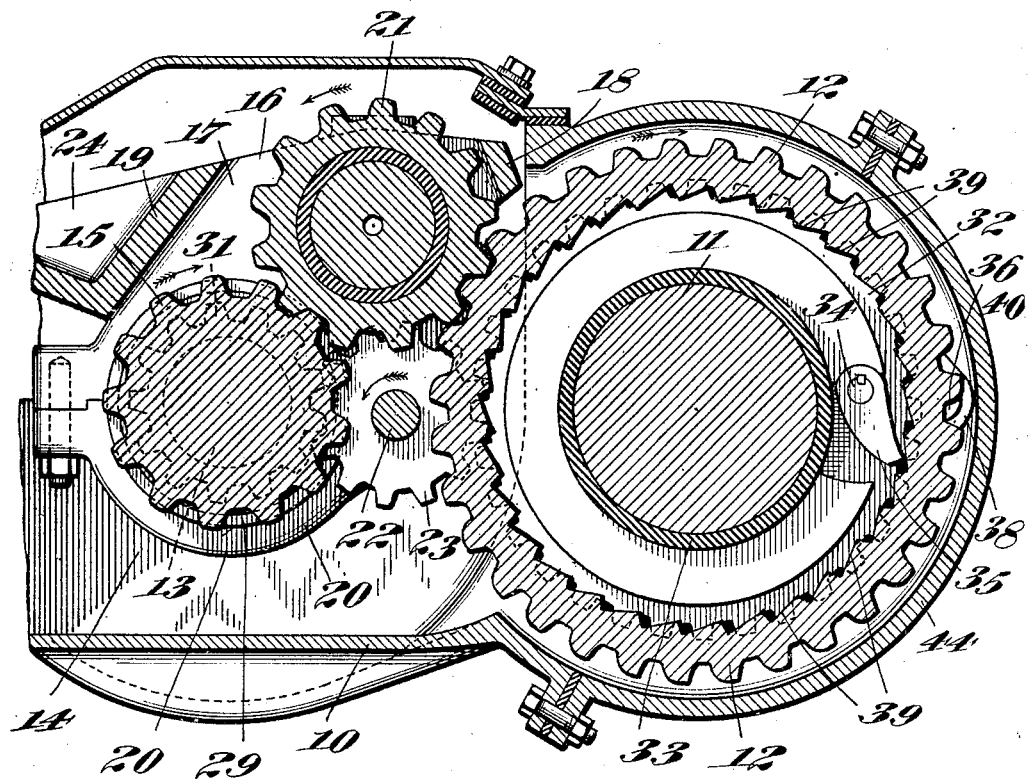

Patented Feb. 9, 1932

1,844,244

UNITED STATES PATENT OFFICE

ROBERT S. A. DOUGHERTY, OF BETHLEHEM, PENNSYLVANIA, ASSIGNOR TO BETHLEHEM STEEL COMPANY, A CORPORATION OF PENNSYLVANIA

GEAR ENTRAINING MECHANISM

Application filed June 8, 1929. Serial No. 369,361.

This invention relates to an improved gear entrainment mechanism and has for its primary object to provide for automatic and positive positioning means for entraining driving and driven gears with each other in a manner which will prevent clashing and for automatically disconnecting the gears when the driving force of the driving gear is discontinued.

Another object is to provide a mechanism comprising driving and driven trains, which is characterized by the fact that the means for effecting the entrainment is operatively controlled and actuated by the driving train to establish and constantly maintain such entrainment during the operation of the driving train, to provide an uninterrupted transmission of power from the driving train to the driven train.

A further object is to provide a gear entrainment mechanism having a driving train, a driven train, and a timing or transmission train which is responsive to the operation of the driving mechanism to effect a torque reaction between the driving and driven trains effective to move the actuating gear of the driving train into engagement with the gear of the driven train and to break the torque engagement of the transmission train upon the engagement of the driving and driven members.

My invention may be used for establishing connection between driving and driven gears in mechanisms of different forms, such as starting internal combustion engines, but it finds its particular advantage when used for entraining the gears of an auxiliary locomotive or the like and for illustration it is this last mentioned application which I have chosen to describe.

The novel features will be more fully understood from the following description and claims taken with the drawings in which:

Fig. 5 is a longitudinal sectional elevation through the frame taken on the line 5—5 of Fig. 1 and showing the friction ring and rocker bracket;

Fig. 6 is a plan view of the rocker bracket as shown in Fig. 5;

Fig. 7 shows the driving gear in engagement with the driven axle gear and the profile of the teeth of the two gears;

Fig. 8 is a side view of the driving axle transmission gear showing the recessed portions adapted to accommodate the pawl and its operating lever;

Fig. 9 is an end view of the driving axle transmission gear as shown in Fig. 8, with the pawl operating lever in assembled position; and Figs. 10 and 11 illustrate two steps in the engagement of the gears, showing the position of the pawl and the toothed rack of the driven gear relative to the various gears.

Figure 1:
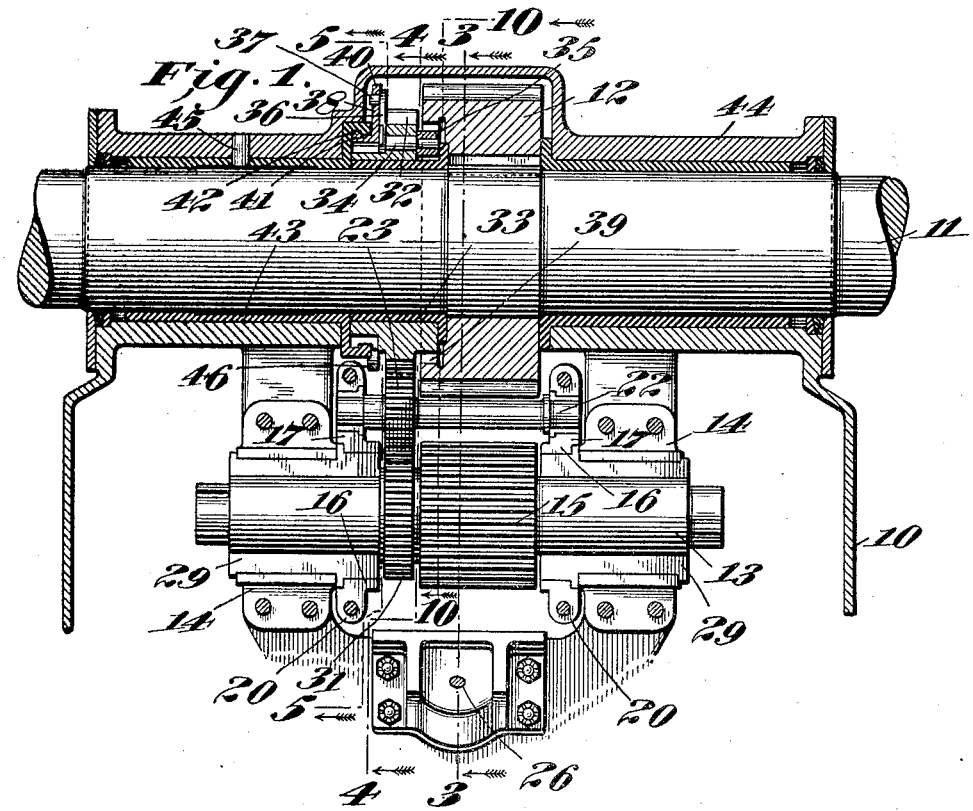
Fig. 1 is a sectional plan view through the forward portion of an auxiliary locomotive frame showing the application and relation of the entraining gears according to my invention.
Figure 2:
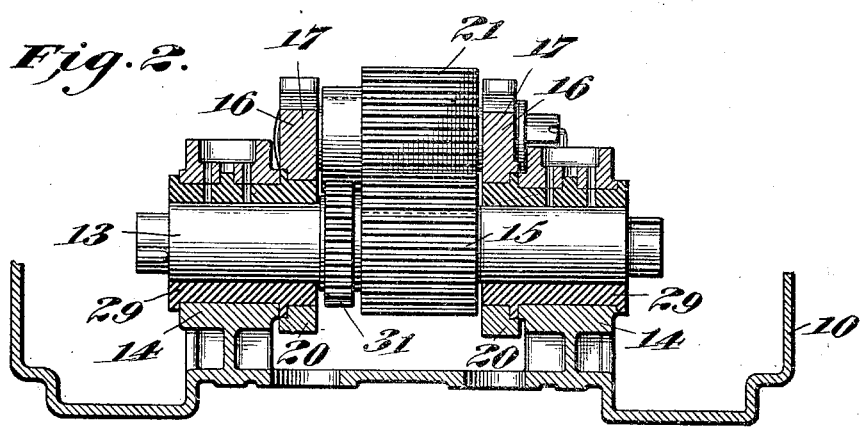
Fig. 2 is a transverse sectional view through the frame in the way of the engine crank shaft taken on line 2—2 as shown in Fig. 4.

As heretofore stated, the present invention is primarily designed for the purpose of entraining an auxiliary propulsion motor for a locomotive with a normally idle truck axle, or one driven at insufficient speed, whereby the tractive effort of the main locomotive may be supplemented at low speeds. It is, of course, also important that when the aid of this auxiliary motor is no longer desired, that it shall be automatically disentrained from the truck axle. However, as will appear from the following description, the present invention is not necessarily restricted to this particular application thereof, but may be readily applied in various other cases to automatically entrain and disentrain a power actuated driving shaft with or from a shaft to be driven thereby.

As illustrated in the accompanying drawings, I have shown a portion of a suitably constructed frame 10 upon which the parts of the auxiliary propulsion motor (not shown) are mounted. Any preferred means may be employed for supporting this motor carrying frame with relation to the truck frame, but I preferably suspend the propulsion motor with its frame between the spaced wheel axles of the truck, one of which I have indicated at 11. This axle has fixed thereon a gear wheel 12, which I designate the driven gear.

The crank shaft 13 actuated through the medium of suitable connections with the propulsion motor is journaled in spaced bearings 14 on frame 10, and this shaft has fixed thereon the driving gear 15 spaced from and out of meshing relation to gear 12 on axle 11.

About the crank shaft 13 is loosely mounted a rocker bracket 16. This bracket is in the form of a yoke as shown in Figs. 5 and 6, having spaced side arms 17 arranged respectively on opposite sides of pinion 15 and engage at their lower ends upon bushings 29 for free rocking movement. The side arms are joined by cross tie members 18 and 19 thereby making the arms integral. A bearing cap 20 is provided for each side arm for assembling purposes. The upper ends of the arms are angularly disposed with relation to shaft bearing 14 and extend above said shaft. Between the latter ends of the arms, gear 21, which I designate the actuating gear, is rotatably mounted, the teeth of said actuating gear being in constant mesh with the teeth of driving gear 15. Forward of the shaft 13 are provided other bearings, the arms in which are mounted the transmission gear shaft 22 and pinion 23 hereinafter referred to. Extending rearwardly from the cross tie member 19 are two arms 24 provided at their lower ends with bearings 25 adapted to accommodate the eye bolt 26 which is pivotally pinned to rocker arms 24. Suitable stops 27 and 28 are provided to limit the forward and rearward rocking movement of the bracket respectively.

The rocker bracket 16 is pivotally mounted about shaft 13 on extensions of bushings 29 which form the bearings for the shaft, thereby relieving the shaft of stresses imparted thereto by the bracket.

Figure 3:
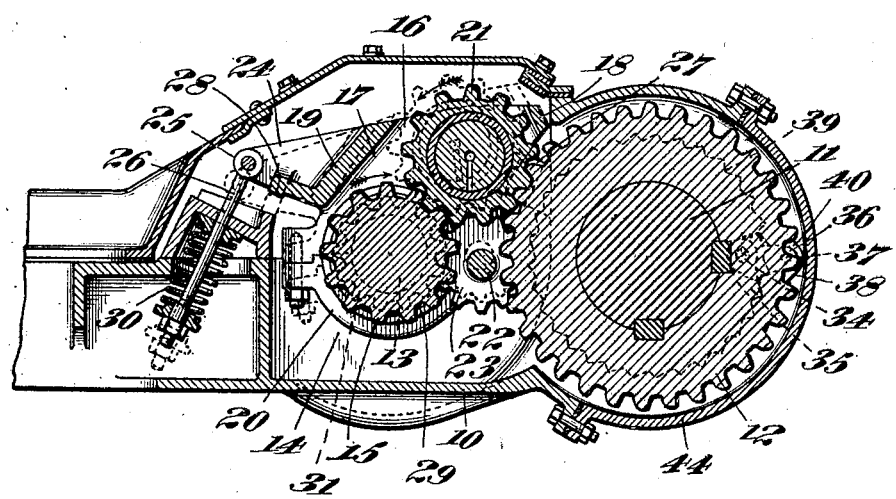
Fig. 3 is a longitudinal sectional elevation through the frame and driving gears taken on the line 3—3 of Fig. 1.
Figure 4:
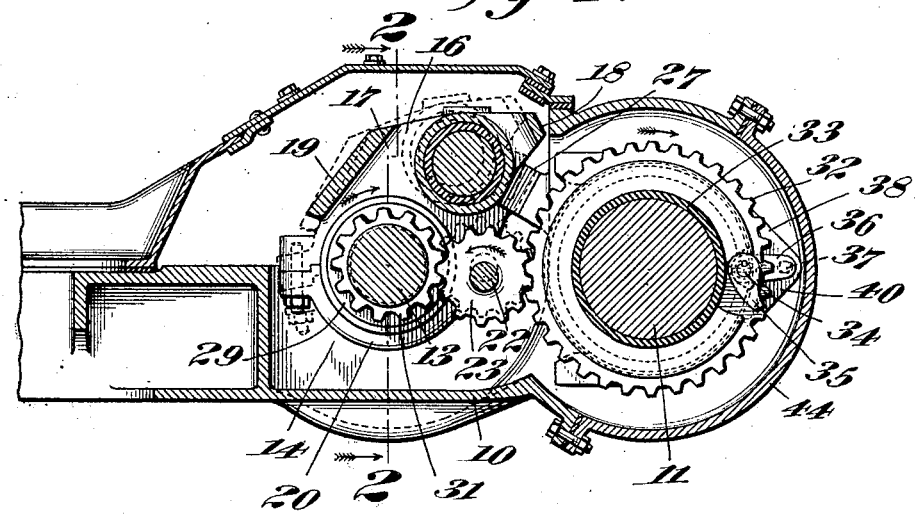
Fig. 4 is a longitudinal sectional elevation through the frame and showing the timing gears taken on the line 4—4 of Fig. 1.

A spring 30, or other resilient means, is provided to exert a downward force on bolt 26 which tends to hold bracket 16 in its rearward position corresponding to the normally disengaged position of actuating gear 21, as shown by the dotted lines in Figs. 3 and 4.

In addition to the driving gear 15 on shaft 13, there is an additional gear 31 fixedly mounted thereon in slightly spaced relation to pinion 15. This second gear 31 is of smaller diameter and of less width than the pinion 15 but has the same number of teeth. Both gears 15 and 31 are preferably made integral with the shaft 13.

The gears 31 and 23 comprise two of a train of three transmission gears. The third transmission gear 32 is loosely mounted on a bushing 33 which is pressed on the axle 11. This last mentioned gear 32 is of less diameter and width than the gear 12 but the number of teeth in both of these gears are equal. The transmission gears are constantly in mesh with each other as shown in Fig. 4.

In the web of the gear 32 is journaled a shaft 34 having an extending end to which a pawl 35 is attached. At the opposite end of shaft 34 extends a lever 36 which is preferably solid with the shaft. The end of lever 36 is provided with a pin 37 which is adapted to engage the friction ring 38 as shown in Figs. 1, 4 and 5. Lever 36 is provided with abutment faces 37' which are adapted to coact with similar faces 39' on timing gear 32, for the purpose of limiting the rocking motion of the pawl as illustrated in Fig. 9.

As shown in Figs. 1 and 3 it will be seen that gear 12 is annularly recessed on the side towards the pawl 35. In this annular recessed portion of the gear are ratchet teeth 39, adapted to be engaged by the end of the pawl 35, the number of these ratchet teeth corresponding with the number of teeth of gear 12.

Adjacent lever 36 is mounted friction ring 38 which is operatively connected with pawl 35. This friction ring is in the form of a semicircle having parallel ends extending beyond the axis of the ring and proportioned to provide a balanced unit about its axis. This construction forms an open ended U-shaped piece which is adapted to be assembled transversely of the axis of axle 11. The ring comprises a vertical web 40 having an extending end portion which is adapted to engage the pin 37 of the pawl operating lever and a coaxial portion 41 integral therewith. At the end of portion 41 is an outwardly extending flange portion 42, the inner edge of which is beveled. Portions 41 and 42 are turned to a true circle which terminates at the inside faces of the U-shaped web.

The friction ring rides in a split bushing 43 which forms a unit bearing for the ring and the axle as illustrated in Fig. 1. The two portions of the bushing are fixed to frame 10 and bearing cap 44 respectively, by means of dowel pins 45 to prevent their turning. In assembling the ring, it is first slipped over the axle and moved into position over the hub portion of gear 32 into engagement with pin 37 of the pawl lever. The shaft is then assembled in the bearing of the frame 10 and the bearing cap 44 with its half bushing is then placed into position over the ring and the axle and secured in place.

Referring to Fig. 5 it will be noted that between the open ends of ring 38, is placed a leaf expansion spring 46 set in notches in the inside faces of the ring. This is for the purpose of expanding the ends of the ring to compensate for frictional wear, thereby maintaining the turning frictional resistance between the ring 38 and the bushing 43. The spring is placed in position after the ring has been placed over the axle and before the bearing cap 44 is secured into place.

The gearing as a whole is enclosed within a suitable housing or frame 10 which is adapted to contain a bath of lubricating oil whereby all of the parts will be automatically lubricated.

Referring to Fig. 3 of the drawings, it will be observed that when the propulsion motor is not in driving engagement with axle 11, rocker bracket 16 and gear 21 are in their disengaged position as shown by the dotted lines. In this disengaged position, stop 28 is in engagement with a similar coacting abutment on frame 10 and the rocker is held in this position by the action of spring 30. Upon supplying steam or other motive agent to the propulsion motor, rotation is transmitted through crank shaft 13 to the train of transmission gears 31, 23 and 32 respectively in the direction as indicated by the arrows in Fig. 4. Since the teeth of the transmission gears are in constant mesh, gear 32 will be driven in a clockwise direction, carrying with it pawl 35 which is secured to shaft 34. As gear 32 is revolved, the toe of the pawl is moved outwardly into engagement with the ratchet teeth on the annular recessed portion of gear 12. The pawl is thrown outwardly due to the fact that pawl operating lever 36 is operatively connected to friction ring 38 by means of pin 37, therefore when gear 32 is advanced there is a backward movement of lever 36 relative to the gear because of the initially stationary position of the friction ring. As the throw of the pawl is limited by stops 37' on lever 36, further rotation of gear 32 beyond that required to throw the pawl, will result in dragging the friction ring with it. As the engagement of the pawl with the ratchet teeth of gear 12 prevents further forward rotation of gear 32 relative to gear 12, further rotation of gear 31 will cause gear 23 to revolve about gear 32 in a downwardly direction which will rock bracket 16 in the direction of gear 12, carrying with it actuating gear 21 into engagement with gear 12. Since actuating gear 21 is always in mesh with the driving gear 15, and since gear 31 is fixed to the same shaft 13 as is driving gear 15, and is a member of the train which includes gear 32, it is evident that there will be a definite relationship between the angular disposition of the teeth of gears 21 and 22 when they are brought into engagement. To prevent clashing of the teeth of gears 21 and 12 during engagement, ratchet teeth 39 are so disposed relative to the teeth of gear 12 and pawl 35 is so positioned and of such dimensions that the teeth of actuating gear 21 positively mesh with the teeth of driven gear 12 upon engagement, without clashing.

Figure 10:
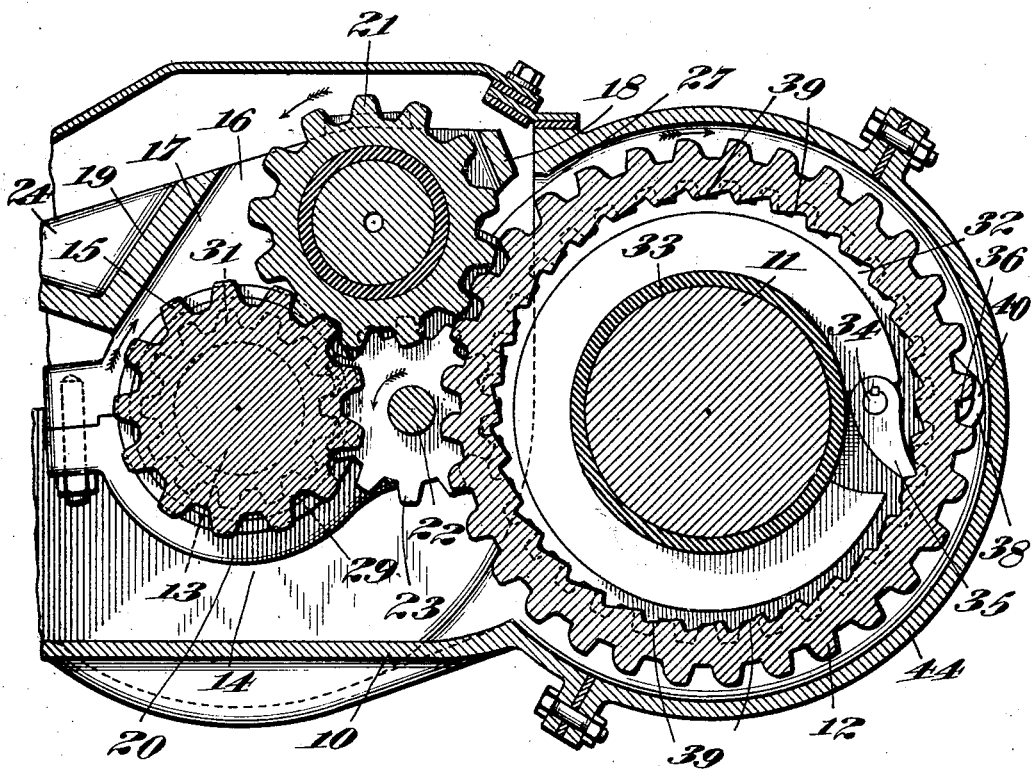

To describe the entrainment of the gears more fully, attention is called to Figs. 10 and 11 which illustrate two steps of the engagement. Fig. 10 shows the first step as the result of the initial action of the motor, with the end of pawl 35 abutting ratchet teeth 39 and a tooth of gear 21 in contact with a tooth of gear 12 but not in full mesh therewith. At this stage, the transmission gears, the driving and the driven gears practically constitute a locked gear train in combination with the pawl and rack engagement. The second step or full engagement is obtained by the continued action of the driving motor tending to further revolve the gear 21 which causes the rocker bracket to be depressed until it is brought to a positive stop, which at the same time brings the pitch circles of the actuating and driven gears tangent as shown in Figs. 7 and 11.

Referring to Figs. 7 and 10 and for the purpose of description it may be assumed that gear 12 is dead. It will be noted that upon the initial engagement of gears 12 and 21 as shown by the dotted lines of Fig. 7 that the upper side of the tooth of gear 21 is in contact with the under side of the tooth of gear 12. At this point of engagement the turning of gear 21 is momentarily retarded as the teeth of the two gears come into contact with each other, but as gear 15 continues to turn, gear 21 is caused to revolve through a small arc about gear 15 in a downward direction toward gear 12 which obviously imparts a downward motion to rocker bracket 16.

As gear 21 approaches gear 12 during this final stage of engagement, the faces of the teeth of the two engaging gears are caused to slide over each other into full engagement which moves the rocker forward until it reaches its positive stop which determines the driving relation between gears 21 and 12.

It will also be noted that due to the direction of rotation of gear 21 and its relative rotation about driving pinion 15, that the teeth of the idler approach the teeth of driven gear 12 with a rolling motion during the initial step of engagement, and the final step of engagement results in a sliding contact between the teeth of gear 21 and the teeth of driven gear 12, which greatly reduces the shock upon the teeth at the time of engagement. Should gear 12 be in motion at the time of engagement, the blow upon the teeth is reduced to a minimum because of the fact that the idler does not have to pick up a dead load.

During the second or final step of engagement, and as previously pointed out, further engagement between the teeth of the actuating and driven gears is accompanied by a downward motion of the rocker, thereby depressing timing gear 23 which imparts a relative backward motion to gear 32 thus causing the disengagement of the end of the pawl relative to the tooth of the rack as shown in Fig. 11. During the second step of engagement there is practically no rotary motion of gears 21 and 23 relative to crank shaft 11, which contributes to the backward motion of gear 32, and causes the pawl to back away from the rack. With gear 21 in full mesh with gear 12 there is no driving power being transmitted to the rack teeth through the pawl, or in other words, all the driving force of the motor is transmitted through the driving gears to the driven axle and not through the transmission gears and the pawl which normally transmit no power other than to cause the initial entrainment of gear 21 with gear 12.

Immediately upon effecting such entrainment, a positive power driving impulse is transmitted to axle 11 whereby the movement of the train will be appreciably accelerated. When the movement of the train has reached a speed of about 15 miles per hour and the aid of the auxiliary propulsion unit is no longer desired or necessary, the supply of steam or other motive agent to the said unit is cut off, thereby discontinuing the further rotation of crank shaft 13. Inasmuch as the sustained engagement of actuating gear 21 with gear 12 is dependent upon the continuous driving effort of the auxiliary unit, disengagement of these gears will take place when the motive agent is cut off, because of the action of spring 30 tending to rotate rocker bracket 16 in a backward direction, which carries the actuating gear with it and thereby producing disengagement between the power transmitting gears. The disengagement is assisted by the action of gear 12 which has the normal tendency to force gear 21 out of meshing engagement when the power is shut off. Thus the disentrainment of driving shaft 13 from axle 11 is instantaneously automatic when the propulsion unit is cut out.

It will be obvious that when crank shaft 13 ceases to rotate, that gear 21, transmission gears 31, 23 and 32, and friction ring 38 will also cease to rotate but that axle 11 with its gear 12 may continue to rotate. The continued rotation of axle 11 causes rack teeth 39 of gear 12 to track around pawl 35 thereby moving the end of the pawl inwardly, and out of engagement with the rack. The movement thus imparted to the pawl is transmitted to the lever 36 which causes friction ring 38 to be rotated slightly in a forward direction which is limited by stop 37' on the pawl lever. The pawl now being out of engagement with the rack, is positively held in this position by the friction ring and gear 32 which have ceased to rotate, thereby allowing free clockwise or counterclockwise rotation of axle 11 when the motor driving crank shaft 13 is dead. Further engagement of the pawl with the rack teeth of gear 12 will not take place until the motive agent has again been admitted to the propulsion unit.

From the foregoing description considered in connection with the accompanying drawings, it will be seen that in each instance, I effect entrainment between the spaced disengaged driving and driven members through the medium of means which are operatively controlled and actuated by the driving member, and which during the operation of the driven member, constantly maintain an uninterrupted transmission of power from the driving member to the driven member. At the same time, the several parts of this automatic entraining mechanism are so constructed and arranged that upon the removal of the application of power to the driving shaft, the automatic disentrainment of said shaft from the driven shaft results. Furthermore, a gear entrainment mechanism constructed according to my invention provides for the engagement of normally spaced disengaged gears in such a manner that the teeth of the engaging gears are relatively positioned one to the other whereby the positive and free meshing of the teeth is obtained, thereby eliminating clashing and probability of serious damage to the gears and mechanism as a whole. It is also immaterial, whether or not the driven gear is in a state of rest or motion at the time of entrainment, as the entraining mechanisms will function automatically and equally as well one way or the other.

A device of this nature is of great practical importance, especially in connection with the operation of auxiliary propulsion units for locomotives, starting motions for internal combustion engines or the like, as I am enabled thereby to dispense with the use of more or less complicated arrangements of piping, control valves, cams, unreliable latches and similar devices such as have heretofore been proposed for this purpose, none of which provide for the positive relation of the engaging gears such as I propose. It will be noted that I avoid the use of delicate mechanical elements which might be easily damaged so that the device will be at all times positive and reliable in the performance of its functions and will require a minimum amount of inspection and repair.

While I have shown my invention in one form, it will be obvious to those skilled in the art that it is not so limited, but is susceptible of other changes and modifications without departing from the spirit thereof and I desire therefore that only such limitations shall be placed thereupon, as are imposed by the prior art, or as, are specifically set forth in the appended claims.

Having thus described my invention what I claim as new and desire to secure by Letters Patent is:

1. In an entraining mechanism, a driving train including an actuating gear, a driven train including a driven gear, said gears normally being out of engagement with each other, means actuated by the operation of the driving train to lock the driving train to the driven train to establish a definite meshing relationship between the actuating and driven gears, and means actuated by the driving mechanism to effect engagement between the actuating and driven gears.

2. In an entraining mechanism, a driving train including an actuating gear, a driven train including a driven gear, said gears being normally out of engagement with each other, means responsive to the operation of the driving train to engage an element of the driven train and thereby produce a reaction between the driving train and the driven train to move the actuating and driven gears into mesh.

3. In an entraining mechanism, a driving train including an actuating gear, a driven train including a driven gear, said gears being mounted to permit of relative movement to and from meshing engagement, and means responsive to the operation of the driving train to effect a reaction between the driving train and the driven train effective to move the actuating and driven gears into engagement.

4. In an entraining mechanism, a driving train including an actuating gear, a driven train including a driven gear, said gears being mounted to permit of relative movement to and from meshing engagement, and means actuated by the driving train engageable with the driven train to exert a torque thereon effective as the result of the resistance of the driven train to move the actuating and driven gears into meshing engagement.

5. In an entrainment mechanism, a driving train including an actuating gear, a driven train including a driven gear, said gears being mounted to permit of relative movement to and from engagement, a transmission train driven by said driving train, means to bring the transmission train into torque exerting engagement with the driven train, said transmission train being operatively connected to said gears to move them into engagement as a result of the resistance of said driven train to said torque.

6. In an entrainment mechanism, a driving train including an actuating gear, a driven train including a driven gear, said gears being mounted to permit of relative movement to and from engagement, a transmission train driven by said driving train, means actuated by the operation of said transmission train to bring said transmission train into torque exerting engagement with the driven train, said transmission train being operatively connected to said gears to move them into engagement as a result of the resistance of said driven train to said torque.

7. In an entrainment mechanism, a driving train including an actuating gear, a driven train including a driven gear, said gears being mounted to permit of relative movement to and from engagement, a transmission train driven by said driving train, means to bring the transmission train into torque exerting engagement with the driven train, said transmission train being operatively connected to said gears to move them into partial meshing engagement as a result of the resistance of said driven train to said torque, and means to bring the said gears into complete meshing engagement and to break the torque exerting engagement of said transmission and driven trains.

8. In an entrainment mechanism, a driving train including an actuating gear, a driven train including a driven gear, said gears being mounted to permit of relative movement to and from engagement, means operated by the driving train engageable with the driven train to exert a torque thereon, means to move said gears into partial meshing engagement as a result of the resistance of the driven train to said torque, and means effective as a result of the resistance to turning of said driven train to complete the meshing engagement of said gears and to break said torque exerting engagement.

9. In an entrainment mechanism, a driving train including an actuating gear, a driven train including a driven gear, said gears being mounted to permit of relative movement to and from engagement, a transmission train driven by said driving train, means to bring the transmission train into torque exerting engagement with the driven train, said transmission train being operatively connected to said gears to move them into engagement as a result of the resistance of said driven train to said torque, and means exerting a force tending to separate said gears.

10. In an entrainment mechanism, a driving train including an actuating gear, a driven train including a driven gear, said gears being mounted to permit of relative movement to and from engagement, a transmission train driven by said driving train, means to bring the transmission train into torque exerting engagement with the driven train, said transmission train being operatively connected to said gears to move them into partial meshing engagement as a result of the resistance of said driven train to said torque, and means to bring the said gears into complete meshing engagement and to break the torque exerting engagement of said transmission and driven trains, and means exerting a force tending to separate said gears.

11. In an entrainment mechanism, a driving train including an actuating gear, a driven train including a driven gear, said gears being mounted to permit of relative movement to and from engagement, a transmission train driven by said driving train, means to bring the transmission train into torque exerting engagement with the driven train, said transmission train being operatively connected to said gears to move them into partial meshing engagement as a result of the resistance of said driven train to said torque, means to bring said gears into complete meshing engagement, and means effective as a result of the complete meshing engagement of said gears to break the torque exerting engagement of said transmission and driven trains.

12. In an entrainment mechanism, a driving train including an actuating gear, a driven train including a driven gear, said gears being mounted to permit of relative movement to and from engagement, a transmission train driven by said driving train, means to bring the transmission train into engagement with the driven train to establish a definite meshing relationship between said gears, and means actuated by said driving means to bring said gears into meshing engagement.

13. In an entraining mechanism, a driving train including an actuating gear, a driven train including a driven gear, said gears normally being out of engagement with each other, means actuated by the operation of the driving train to lock the driving train to the driven train to establish a definite meshing relationship between the actuating and driven gears, means actuated by the driving mechanism to effect partial engagement between the actuating and driven gears, and means to complete the meshing engagement of said gears and to break the locking relationship between the driving train and the driven train.

14. In an entrainment mechanism, a driving shaft having a driving gear, a driven gear, a rocker member mounted upon said shaft and carrying an actuating gear constantly engaged with said driving gear but normally out of engagement with the driven gear, and means including auxiliary gear members adapted to be driven by said shaft and so related to said driven and actuating gears that upon rotation of said shaft the meshing relation of the teeth of the said driven and actuating gears will be established and cause the said actuating gear to be moved from its normally spaced position into driving engagement with said driven gear.

15. In an entrainment mechanism, a driving shaft having a driving gear, a driven shaft including a driven gear having a toothed rack, a rocker member mounted about said driving shaft carrying an actuating gear in constant mesh with said driving gear but normally out of engagement with said driven gear, an auxiliary gear train driven by the driving shaft, a pawl operatively connected to the auxiliary gear train, and means operatively engaging said pawl, whereby the rotation of said driving shaft will cause the pawl to engage the toothed rack of the driven gear and thereby establish the meshing relation of the teeth of the said driven and actuating gears and cause the said actuating gear to be moved from its normally disengaged position into driving engagement with the said driven gear.

16. In an entrainment mechanism, a driving shaft having a driving gear, a driven shaft including a driven gear having a toothed rack, a rocker member mounted upon said driving shaft and carrying an actuating gear in constant mesh with said driving gear but normally out of engagement with said driven gear, an auxiliary gear fixed to said driving shaft, a second auxiliary gear carried by said rocker and meshing with said first auxiliary gear, a third auxiliary gear loosely mounted on said driven shaft and meshing with said second auxiliary gear, a pawl having a lever carried by said third auxiliary gear, means adapted to operate the pawl lever when said driving shaft is rotated to effect the engagement of the pawl with said rack to establish a definite meshing relationship of said actuating gear and driven gears, whereby the clashing of said actuating and driven gears is prevented upon their engagement.

17. In an entrainment mechanism, a driving shaft having a driving gear, a driven shaft including a driven gear having a toothed rack, or rocker member mounted about said driving shaft carrying an actuating gear in constant mesh with said driving gear but normally out of engagement with said driven gear, an auxiliary gear fixedly mounted on said driving shaft, a second auxiliary gear carried by said rocker and meshing with the first auxiliary gear, a third auxiliary gear loosely mounted on said driven shaft and meshing with said second auxiliary gear, a pawl having a lever carried by said third auxiliary gear, a friction member adapted to operatively engage said pawl and rotatably mounted about said driven shaft but frictionally retarded relative thereto, whereby the pawl will be caused to engage said rack upon the rotation of the driving shaft and thereby establish a definite meshing relationship of said actuating and said driven gears and prevent clashing upon their engagement.

18. In an entrainment mechanism, a driving shaft having a driving gear, a driven shaft including a driven gear having a toothed rack, a rocker member mounted about said driving shaft carrying an actuating gear in constant mesh with said driving gear but normally out of engagement with said driven gear, an auxiliary gear train driven by the driving shaft, a pawl operatively connected to the auxiliary gear train, and means operatively engaging said pawl, whereby the rotation of said driving shaft will cause the pawl to engage the toothed rack of the driven gear and thereby establish the meshing relation of the teeth of the said main driven and actuating gears and cause the said actuating gear to be moved from a normally idle position into driving engagement with the said driven gear, and means adapted to disengage said actuating gear from said main driven gear upon the removal of the driving force from said driving shaft.

19. In an entrainment mechanism, a driven gear having a toothed rack, a driving shaft having a driving gear, a rocker member mounted about said shaft carrying an actuating gear which is constantly engaged with said driving gear, an auxiliary gear train adapted to be operated by said driving shaft, a pawl operatively connected to said auxiliary gear train, means whereby the initial rotation of said shaft will cause the said pawl to engage the toothed rack of the driven gear and thereby establish the meshing relation of the teeth of said driven and actuating gears and cause said actuating gear to be moved from its normally spaced position into initial partial meshing engagement with the said driven gear, and means effective upon further rotation of said shaft to effect the full meshing relation of said gears and to disengage said pawl from said rack.

20. In an entrainment mechanism, a driving shaft having a driving gear, a driven shaft including a driven gear having a toothed rack, a rocker member mounted about said driving shaft carrying an actuating gear in constant mesh with said driving gear but normally out of engagement with said driven gear, an auxiliary gear train driven by the driving shaft, a pawl operatively connected to said auxiliary gear train, a friction member rotatably mounted about said driven shaft but frictionally retarded relative thereto and operatively connected to said pawl, and means adapted to compensate for the wear on said friction member whereby its friction is maintained.

21. In an entrainment mechanism, spaced driving and driven shafts having driving and driven gears fixed thereto respectively, an actuating gear movably engaged with the driving gear, and means adapted to automatically establish a definite meshing relationship between the teeth of said actuating and said driven gears upon the application of power to said driving shaft, said means including an auxiliary gear fixedly secured to said driving shaft, an auxiliary gear loosely mounted on said driven shaft adjacent said driven gear, a pivotally mounted auxiliary intermediate gear operatively connecting aforesaid auxiliary gears, a pawl pivotally mounted on said loosely mounted gear and adapted to engage said driven gear, a rotatable member frictionally mounted about the axis of said driven shaft and operatively engaging said pawl.

22. In an entrainment mechanism comprising disengaged driving and driven shafts having gears fixedly secured thereto, an auxiliary gear loosely mounted on said driven shaft and operatively connected to said driving shaft, a pawl pivotally mounted on said loose auxiliary gear and adapted to operatively engage said driven gear, a normally idle friction member rotatably mounted about the axis of said driven shaft and operatively engaging said pawl, said friction member being adapted to hold said pawl in a normally disengaged position relative to said driven gear, whereby said driven shaft may be freely rotated in either a forward or backward direction when said driving shaft is idle.

23. In an entraining mechanism comprising driving and driven shafts, a gear fixed on each of said shafts and the gear on said driven shaft having a toothed rack, a rocker member mounted about the driving shaft, an actuating gear carried by said rocker member and constantly engaged with the gear on said driving shaft but normally disengaged from the gear on the driven shaft, an auxiliary gear fixed to said driving shaft, an auxiliary gear loosely mounted on said driven shaft, an auxiliary gear carried by said rocker member in constant engagement with aforesaid auxiliary gears, a pawl member adapted to engage said toothed rack mounted on said loosely mounted auxiliary gear, a lever operatively connected to said pawl, a rotatable member for frictionally resisting the movement of said lever, said pawl being actuated in the initial operation of the driving shaft to engage said toothed rack to impart a planetary movement to the actuating gear relative to said driving gear and move said actuating gear into definite meshing relation with the gear on the driven shaft and subsequently disengage said pivoted member from said toothed rack, and means for automatically operating upon the removal of the driving force from said shaft to restore said rocker member and said actuating gear to normal disengaged position and thereby disentrain said driving and driven shafts.

24. In an entraining mechanism comprising driving and driven shafts, a gear fixed on each of said shafts, a rocker member mounted about the driving shaft, an actuating gear carried by said rocker and constantly engaged with the gear on said driving shaft but normally disengaged from the gear on the driven shaft, communicating means between said driving shaft and said driven gear adapted to establish a fixed meshing relation between the teeth of said actuating gear and the teeth of said driven gear, whereby the rotation of the driving shaft will cause said actuating gear to be moved from its normally disengaged position into positive meshing engagement with said driven gear, and means adapted to disengage said actuating gear from said driven gear upon the removal of the driving force from said driving shaft.

25. In an entraining mechanism comprising spaced driving and driven shafts, a gear fixed to each of said shafts, a supporting frame and bearings for said shafts, an actuating gear movably engaged with the driving gear but normally disengaged from the driven gear, and means including a pawl and a friction member adapted to automatically establish a definite meshing enggement between said actuating gear and said driven gear upon the initial rotation of said driving shaft, said friction member comprising a substantially U-shaped ring having spaced end portions and adapted to frictionally engage said supporting frame and operatively engage said pawl, and a resilient member coacting with the spaced ends of said ring adapted to exert an outward pressure on said spaced ends to thereby maintain the frictional relation between said ring and said frame.

In testimony whereof I hereunto affix my signature.

ROBERT S. A. DOUGHERTY.